US005555223A

United States Patent [19]

Barainsky

[11] Patent Number: 5,555,223
[45] Date of Patent: Sep. 10, 1996

[54] CONSUMER ITEM

[76] Inventor: Markus Barainsky, Windsteiner Weg 27, D-14165 Berlin, Germany

[21] Appl. No.: 290,824

[22] PCT Filed: Feb. 22, 1993

[86] PCT No.: PCT/DE93/00167

§ 371 Date: Aug. 18, 1994

§ 102(e) Date: Aug. 18, 1994

[87] PCT Pub. No.: WO93/17401

PCT Pub. Date: Sep. 2, 1993

[30] Foreign Application Priority Data

Feb. 20, 1992 [DE] Germany .......................... 42 05 400.1

[51] Int. Cl.[6] .............................. G04R 47/00; G04F 8/00; G01D 21/00

[52] U.S. Cl. ............................ 368/10; 368/114; 368/327; 116/206; 374/102; 374/161

[58] Field of Search ........................... 368/10, 62, 82–84, 368/89, 114, 121, 223, 228, 327; 116/200, 206, 207, 219, 308; 374/102–103, 161–162

[56] References Cited

U.S. PATENT DOCUMENTS

| | | | |
|---|---|---|---|
| 4,292,916 | 10/1981 | Bradley et al. | 116/205 |
| 4,367,957 | 1/1983 | Bradley | 368/114 |
| 4,382,700 | 5/1983 | Youngren | 116/216 |
| 4,629,330 | 12/1986 | Nichols | 368/89 |
| 4,903,254 | 2/1990 | Haas | 368/327 |
| 5,058,088 | 10/1991 | Haas | 368/327 |

FOREIGN PATENT DOCUMENTS

| | | |
|---|---|---|
| 0451888 | 10/1991 | European Pat. Off. . |
| 3335301C2 | 1/1985 | Germany . |
| 9015769 | 3/1991 | Germany . |
| 2185137 | 7/1987 | United Kingdom . |
| 2253287 | 9/1992 | United Kingdom . |
| 9104520 | 4/1991 | WIPO . |
| 9106853 | 5/1991 | WIPO . |

*Primary Examiner*—Vit W. Miska
*Attorney, Agent, or Firm*—Chilton, Alix & Van Kirk

[57] ABSTRACT

A process for producing or packing an item with a limited period of use or interest, e.g. a regularly issued periodical or foodstuffs to be consumed within a limited time, in which the consumer item or its packaging is fitted by adhesive means or other means of attachment with a timer having an indication which, close to the time of the production of the consumer item (2), especially at the time of securing to the consumer item or its packing, is set and/or otherwise configured to synchronize its indicator with the actual time, and consumer items produced by the process.

24 Claims, 7 Drawing Sheets

CONSUMER ITEM

BACKGROUND OF THE INVENTION

The invention relates to a process for producing or packing an item with a limited period of use or interest and a consumer item produced according to this process.

The printing of the date of production onto consumer goods (e.g. foodstuffs, medicaments, pharmaceutical products, film material, dyes, adhesives etc. which have a limited period of use), or onto the packaging thereof is known. The date of issue is also indicated on journals and papers thereby providing information on the actual date.

A due date, is, moreover indicated on many consumer goods which provides information on how long they can be preserved, but which does not give an indication of the actual time (and thus no indication on the real degree of freshness).

DE-OS 30 48 426 also discloses a process for detecting the actual state of an item of consumption. Here, a mark is arranged on the item of consumption, whose characteristics change under the conditions in which the product to be controlled changes from a state of usability into one in which it is no longer fit for use. In order to ascertain the state of usability, this mark must be combined with a separate sensing unit. This known arrangement has the disadvantage that the actual time when the consumer item was first used cannot be ascertained and that an additional costly analysis has to be carried out in order to obtain clear information on the condition of the item.

Furthermore, a process is known from DE-OS 30 28 808 which enables a subsequent determination of the time of opening of a package of medicaments in order to control the use thereof. The packaging has a plurality of individual cavities separated from the outside air and from one another and a film closing these cavities. In order to remove the drugs, this film is broken thereby enabling the cavity to come into contact with the outside air. Depending on the length of exposure, the effect of the outside air changes the chemical and physical characteristics of a control substance additionally present in the cavities. The evaluation off the changed characteristics serves to determine the time of opening of the packaging of drugs. This process, however, requires a costly analysis which is a disadvantage and can, moreover, only be carried out with considerable expertise and is therefore quite unsuitable for universal use.

No known solution can provide information on the degree of freshness of the item in question without using an additional device.

All the known prior art devices for marking consumer goods have the disadvantage that they are unable to indicate to the consumer, in a clear, accurate and verifiable manner, the current state of these goods, especially if there is a particularly close time range between the production and use thereof.

SUMMARY OF THE INVENTION

Starting from the deficiencies of prior art, the invention has the object of developing a process which provides a consumer item with a timer for a limited period of use so that a time may be deduced which also informs on the current degree of validity or freshness of the goods without using additional means.

The invention is based on the finding that it is possible to indicate the current degree of validity of a consumer item with a limited range of validity in an advantageous and particularly cost-effective manner, if a timer is arranged thereon in close combination with the time of production off the consumer item, and that this timer may be configured during the manufacturing process for the purpose off giving a time indication.

As this enables the continuous comparison with the actual time, a control of the operational accuracy of the timer is also possible in such cases when an automatic control of the freshness of the consumer item is needed because a specified period of time has expired (state of a time check which started with count "0" when the timer was configured), i.e. when, after reaching a specified count, a display means is activated by the timer which also controls the indication of the actual time. In this case, a comparison of the time indication, starting at 0, with the actual time always enables a control of the timer and the standard time affecting the timer.

Because of the range of validity of the consumer item which is often limited, the timer does not normally have to meet any special requirements with regard to accuracy, so that timers may be used which are simple in construction and not very high cost, especially as a result of dispensing with external adjustment means. Therefore, they may be manufactured at an extremely low cost and arranged during manufacture at a suitable spot on the consumer item, without additional cost. Furthermore, in many applications, the timer only needs to be designed for a short working time so that the energy requirement for the operation of the timer can, advantageously, be kept extremely low. During the manufacturing cycle of the consumer item, the timer is, at the same time, also set in operation in an accurate position for indicating the time.

In advantageous embodiments of the invention, the timer is equipped with a digital and/or an analogue display. The timer with a digital display, has, preferably, a counter controlled by a clock. Here, preferably, the control lines leading to the input of a counter each have bridgeable contact regions. At the end of the manufacturing process of the consumer item, the counter (and therefore the corresponding display) may easily be set to the (clock) time of manufacture by printing over these contact points in certain control leads, for example by means of a conductive printing ink.

The display additionally indicates the actual time. Thus, from the beginning of its manufacture, the timer is synchronised with the time. As the manufacture of a large number of serial products increases, the time configuration of the timer accordingly follows the actual time.

When a timer with analogue display is used, the consumer item is provided, already during the manufacturing process, with a simple dial, in the centre of which there is, at the end of the manufacturing process, a corresponding analogue clock module of the actual time of day provided with pointers and which is operated by means of a switching process. The analogue clock module is, advantageously, set in operation by closing or opening a contact bridge on the module, accessible from outside. The time of setting the module in operation is, at the same time, marked on the dial. The actual time and the time that has elapsed since the manufacture of the consumer item can be read together.

As the configuration of the timer takes place in relation to the time of manufacture of the consumer item provided with the timer, it is possible, with respect to time, to adapt the timer to advantage to the special characteristics of the consumer item. A bridging of dividing stages in the frequency divider of the timer may, in this way, affect e.g. the running speed and thus also the temporal resolution of the timer. Furthermore, additional display means may be activated which are operated by corresponding sensors if the consumer item is subjected to harmful influences. Because the timer is configured when applied to the consumer item at the time of manufacture or packaging, uniformly packaged timers may correspondingly be adapted during the application to the corresponding characteristics of the commodities receiving them.

According to a further advantageous embodiment of the invention, the timer is constructed as a system operating on a chemical basis and having a display track provided with a time scale. The display track is prepared with a substance which is suitable for initiating a chemical process upon supply of a further substance. The two chosen substances are such that a clearly recognisable colour change occurs which continues along the display track when a chemical reaction takes place. The display track and time scale may be attached to the consumer item, by means of pressure and/or gluing. The additional substance producing the colour change is introduced into the display track at the point which corresponds to the time of manufacture, at the end of the process for manufacturing the consumer item. In this way, upon completion of the process, it is easy to read both the time of manufacture and the actual time of day. The display track of the timer applied to the consumer item may either be of an elongated or a curved construction.

In a further advantageous development of the invention, the timer is constructed as a system operating on a physical basis. Here, the time display is advantageously effected by a coloured liquid which is transported from a high-pressure container to an equalising container via a meander-shaped capillary. The transport of fluid is able to start when the system is no longer closed to the atmosphere, preferably within the region of the equalising container. The meander-shaped capillary is elongated or arranged on a circular track. The meander shape of the capillary is of advantage if the realisable time range is to be increased. A timescale arranged parallel to the display track advantageously enables the display of the time of manufacture and the actual time of day.

Consumer items with a very limited time of interest such as journals and papers e.g. dailies, or products which carry a guarantee of freshness are provided with a timer of the above kind. The arrangement of the timer on the front page at the top close to the date is particularly advantageous in the case of dailies. Without additional cost, however, it is also possible to arrange the timer at a suitable spot on selected inside pages of the daily which increases the utility value of the printed product.

In the case of consumer items with a special "freshness-image", preferably milk products, it may be of advantage to arrange the timer on the top of the container in question, since it is immediately visible to the consumer and, apart from the actual purpose of indicating the age of the product, it may take over an advertising function by reminding the user of interval times and the like.

The timer is applied, at least partially, by means of printing or by transfer, more particularly from a film substrate, optionally also by a simultaneous or sequential application of several layers.

In a preferred embodiment, the display, more particularly in the form of line codes, i.e. display devices adjustable by electronic means, may be effected so as to be read mechanically. The state of the consumer items in question may, therefore, be controlled at any time automatically (without human activity) using mechanical means (for example in automatic goods distribution systems). Because of the time display given, when compared with the actual time, it is thereby also possible to ascertain whether the running of the timer applied to the consumer item has been correct since configuration.

A number of further advantageous options exist in another embodiment of the timer:

The display may, for example, consist of flat parts or segments which change their reflection or absorptive capacity or colouring as a function of an applied electric voltage. The existing energy source can therefore be largely preserved resulting in long periods of use.

In order to monitor the goods, the timer is, preferably, provided at least with one additional display element, the input of which is connected with the output of a storage element which in turn is set by a threshold circuit if the output signal of a sensor element connected with the input of the threshold circuit goes above or below a predetermined value. Here, a sensor element responds preferably to temperature, pressure, or ground forces, radiation and/or chemical characteristics of the surrounding medium.

BRIEF DESCRIPTION OF THE DRAWING

The present invention may be better understood and its numerous objects and advantages will become apparent to those skilled in the art by reference to the accompanying drawings wherein like reference numerals refer to like elements in the several figures and in which.

DETAILED DESCRIPTION OF THE PREFERRED EMBODIMENT

Figure 1:
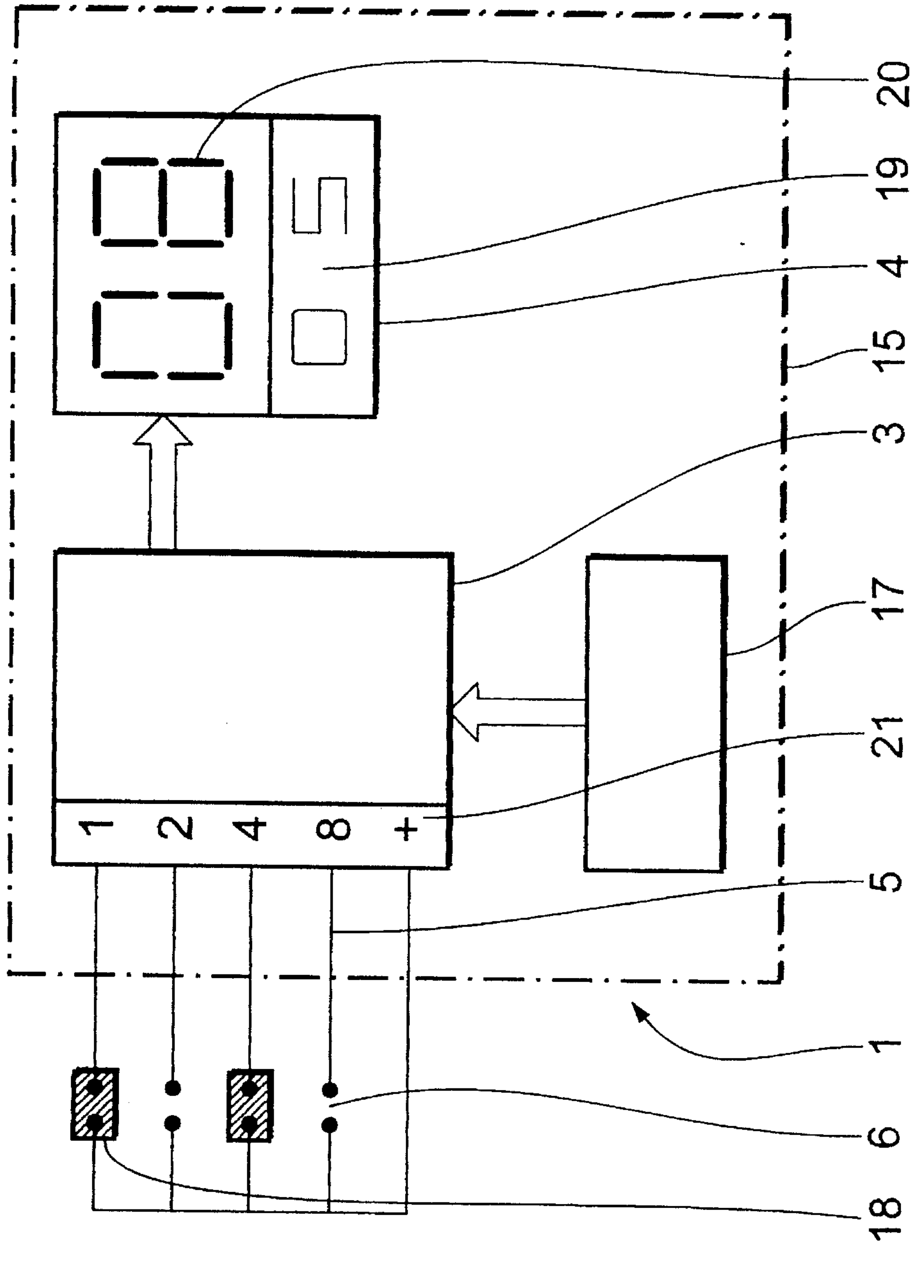
FIG. 1 is a schematic diagram of a digital timer in accordance with the present invention.
Figure 2:
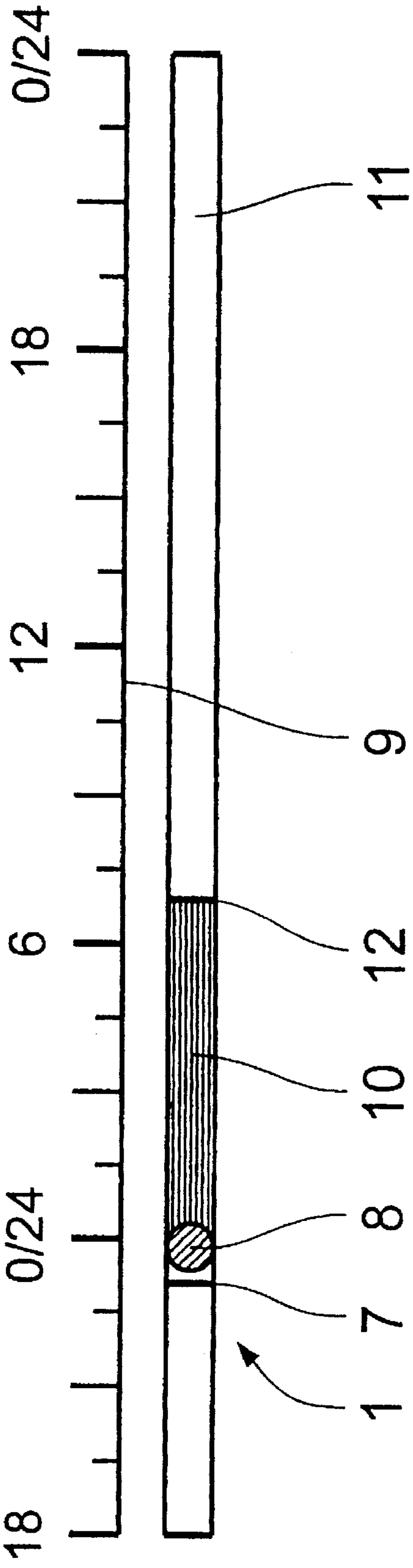
FIG. 2 is a schematic diagram of a timer operating on a chemical basis in accordance with the present invention.
Figure 4:
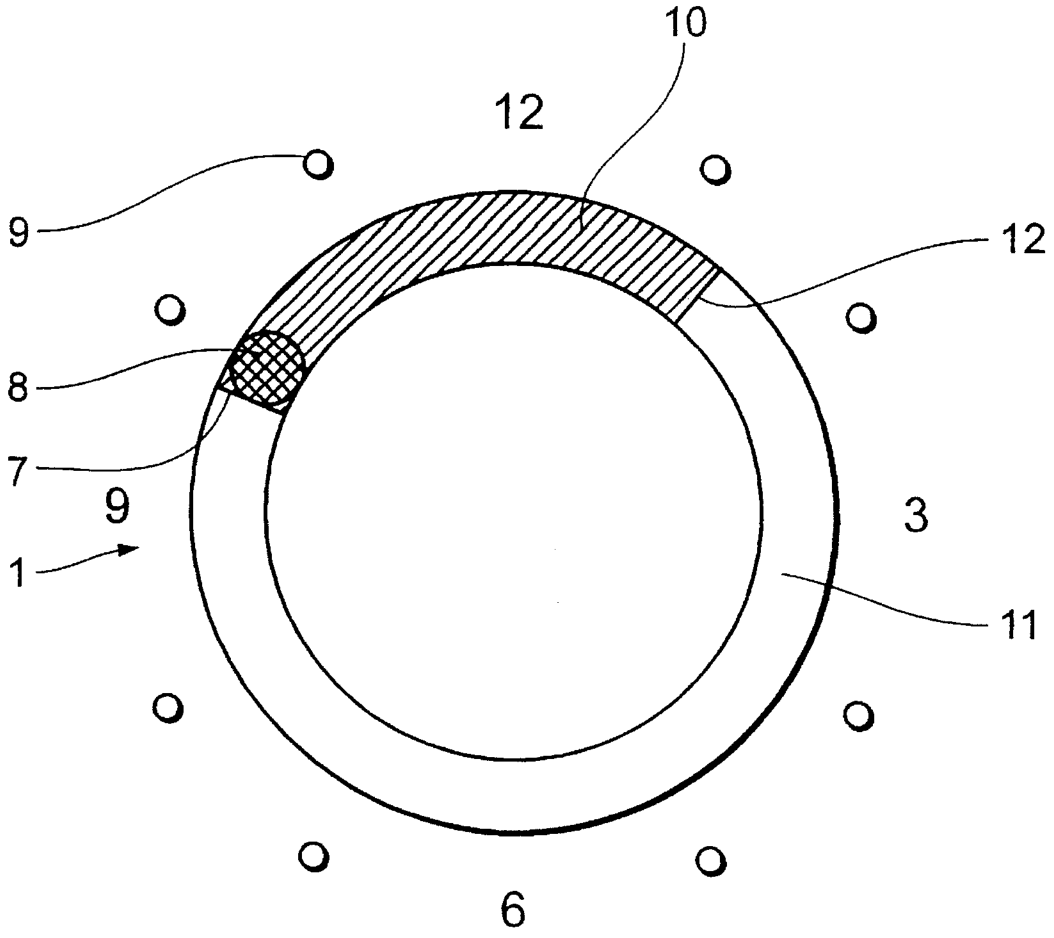
FIG. 4 is a schematic diagram of an alternate embodiment of the timer of FIG. 2.

The timer, shown in FIG. 1, consists of a small compact digital clock module 15, which has a counter 3 controlled by a clock generator 17 and a display 4 connected with the counter. The individual control lines 5 of the additional input 21 of the counter 3 have bridgeable contact point 6, constructed so as to be connectable by a conductive print. During the manufacturing process of the consumer item the timer 1 is attached to the consumer item and, upon completion, set in operation by the conductive print of two contact pairs 6. The bridging 18 of the additional inputs "1" and "4" sets the counter 3 to 5 o'clock, the time of completion of the manufacture, which is indicated in the display portion 19. Based on this time, the display portion 20 indicates the actual time of day. The degree of validity of the consumer item can now be read by a simple comparison. In order to keep the manufacturing costs for the digital clock module 15 especially low, the timer 1 has no external actuating means and only one time display divided into full hours. The timers 1 shown in FIGS. 2 and 4 operate as a chemical system and largely consist of a display track 11 with which a timescale 9 is suitably associated. The components 9 and 11 of the timer 1 are fitted to the consumer item, by means of printing and/or gluing, within a region subsequently easily visible to the consumer, while the consumer item is being manufactured. The display track 11 consists of a fleece-like material impregnated with a substance. This substance, together with an additional substance, starts a chemical reaction which is accompanied by a clearly recognisable colour change. When the manufacturing process of the consumer item is completed, the additional substance is introduced into the display track 11 at the injection point 8 corresponding to the actual time (24 hours), and the display track 11 is simultaneously divided by a separation point 7 into two portions. The colour change triggered off by the chemical reaction can, therefore, only spread in one direction. The end 12 of the changed colour area 10, when compared with the adjacent timescale 9, makes it possible, at the same time, to read the actual time of day and the degree of validity of the consumer item. According to its purpose, the timescale 9 only has a fairly rough 1.5 hour division. In a suitable further construction of the timer 1 as shown in FIG. 4 diagrammatically, the display track 11 and the timescale 9 are circular and the user has largely the impression of reading a traditional clock. In chemically operating timers, a chromatographic process is preferably used, in which a distinctly coloured chemical substance, applied in the form of a dot, is slowly moved away in a predetermined direction, together with a carrier medium.

Figure 3:
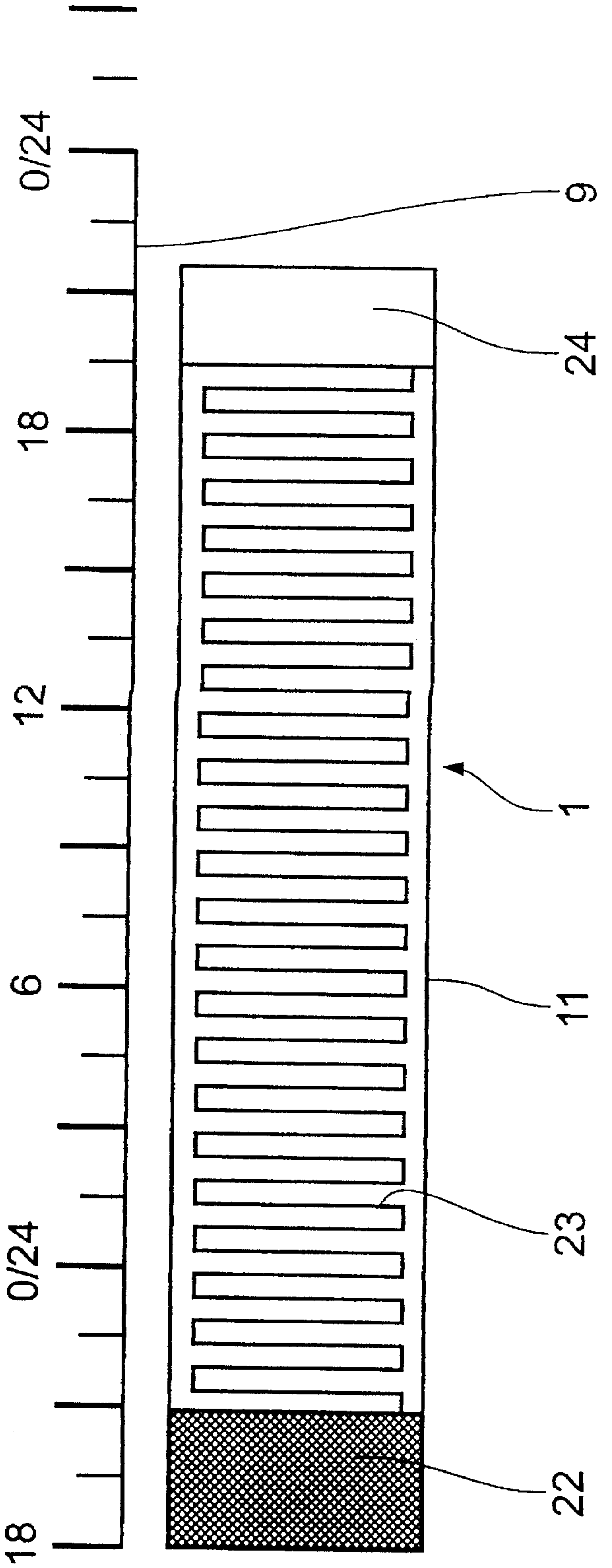
FIG. 3 is a schematic diagram of a timer operating on a physical basis in accordance with the present invention.

FIG. 3 shows a timer 1 which operates by physical means and is in the form of a high-pressure system with respect to the atmosphere. In a pressure container 22, there is a coloured liquid. A meander-shaped capillary 23 which, itself, opens into an equalising container 24 is connected to the pressure container 22. The capillary 23 is arranged on an elongated display track 11 and the liquid slowly passes through it in the direction of the equalising container 24, when said container is connected with the surrounding atmosphere by being pierced or torn. This takes place at the beginning of the manufacturing process. The shaping of the meander makes it possible suitably to determine the time range on the display track 11, based on the product, which time range is marked by the fluid issuing from the pressure container 20. The timer 1 and timescale 9 are secured to the consumer item by pressure and arranged so as to be offset with respect to one another in the longitudinal direction in order to be able to indicate the time of manufacture (21 hours) and the actual time of day (about 9 o'clock) by means of this relative positioning.

Figure 5:
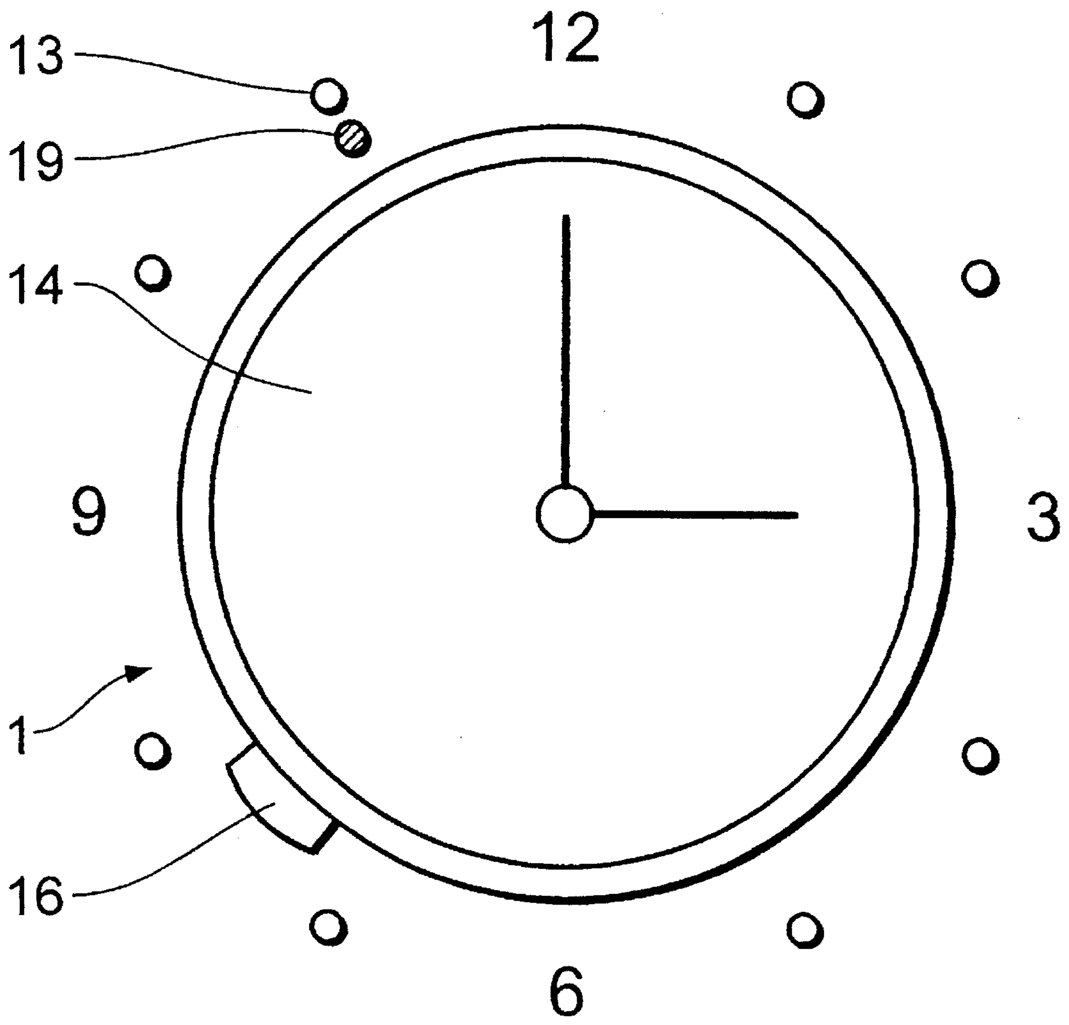
FIG. 5 is a schematic diagram of an alternate embodiment of the timer of FIG. 1.

An embodiment of a timer 1 with an analogue clock module display 14 is shown diagrammatically in FIG. 5. During the manufacture of the consumer item, the dial 13 is mounted by pressure and the clock module 14 is suitably placed inside the dial 13 at the end of the manufacturing process. By simultaneously separating an electric bridge 16, the module 13 is set in operation and this point of time is permanently fixed by a mark 19.

Thus, time of manufacture, actual time and degree of validity may easily be read.

Figure 6:
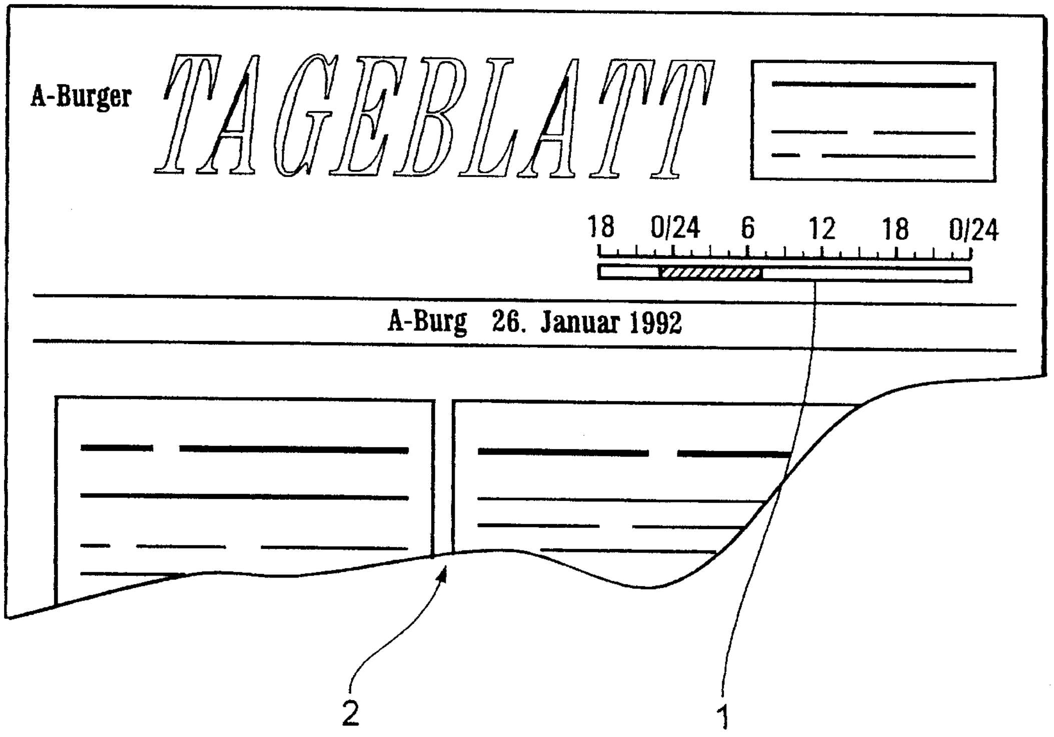
FIG. 6 is a perspective view, partly broken away, of a journal having the timer of FIG. 2.

Here, the time display is also in a 1-hour cycle. FIG. 6 shows a consumer item 2 in the form of a daily paper provided with a timer 1. The timer 1 is in the form of a chemically operating system and displayed on the front page of the daily 2 above the date. This daily was printed at 0.00 o'clock on 26 Jan. 1992. The timer 1, in operation since the printing of the daily 2, continuously informs the reader of the actual time of day. Because of its flexibility, the timer 1 operating on a chemical basis is particularly suitable for use in printed material, since it fulfils the technological conditions of the printing process without any special precautions being necessary.

Figure 7:
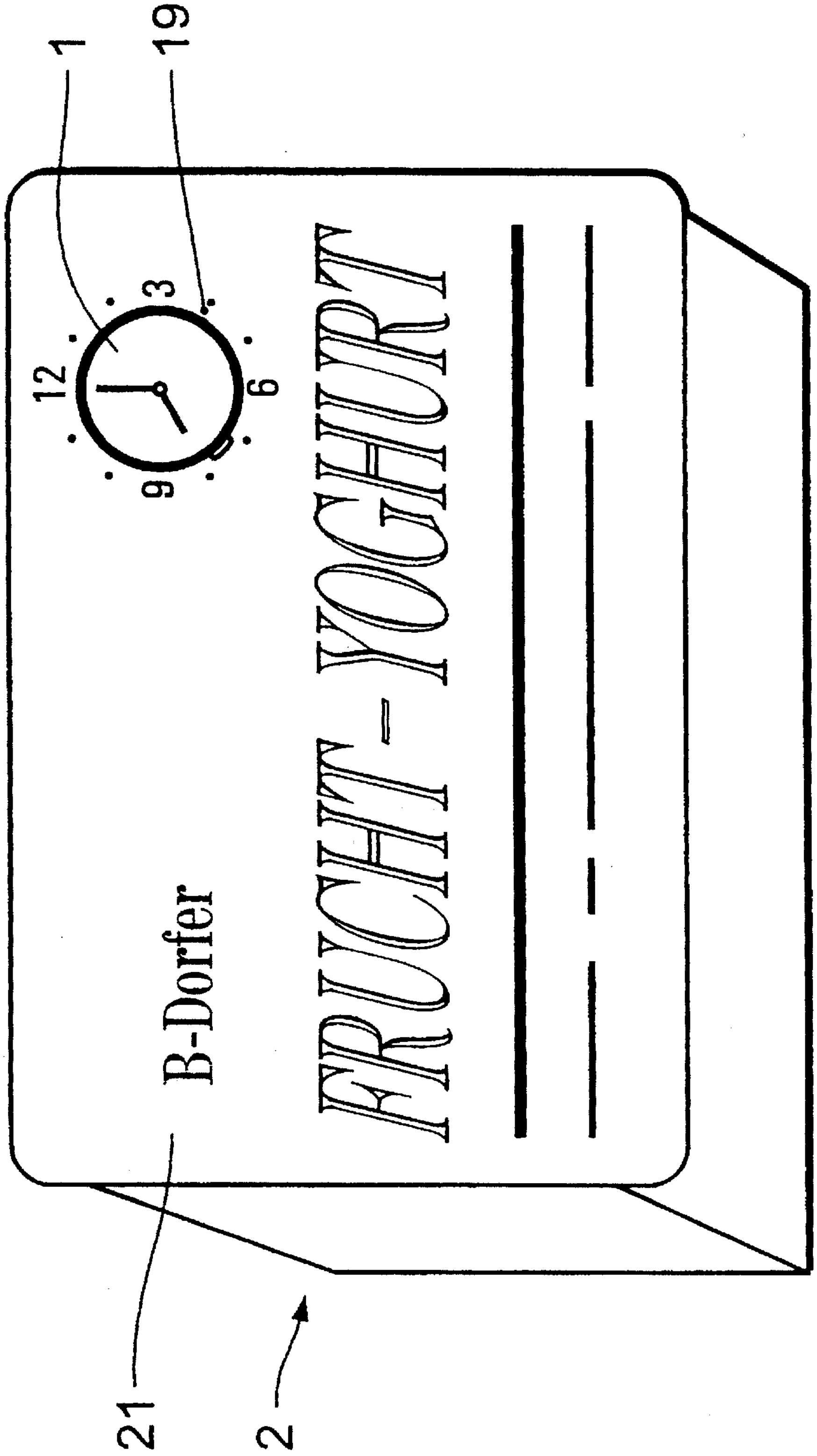
FIG. 7 is a perspective view of a dairy product having the timer of FIG. 5.

Another embodiment of a timer 1 with an analogue display, as shown in FIG. 7 diagrammatically, is arranged on the top 21 of the packaging of a dairy product 2. The timer 1 consists of the dial 13 and the clock module 14 (illustrated more clearly in FIG. 5) and is assembled in two different operations during the manufacturing cycle of the consumer item 2. At the end of the manufacturing cycle, the clock module is set in operation and this time is simultaneously marked on the dial. Mark 19 shows the consumer that in this case the product 2 was produced at 4 o'clock in the morning and that it is fresh and at this moment only about four hours old. The timer 1 can, moreover, also be arranged on the top of re-usable bottles and may simultaneously be used to indicate interval times and the like in an effective advertising manner.

The invention is not restricted in its configuration to the preferred exemplary embodiment specified above. Rather, a number of variants which make use of the solution described are conceivable, even in the case of configurations of a fundamentally different type. The timers may, in particular, also consist of elements which produce a colour change at specified times, this colour change being associated, for example, with a timescale. Accordingly, it is to be understood that the present invention has been described by way of illustration and not limitation.

I claim:

1. A process for producing or packing an item with a limited period of use or interest, more particularly a regularly appearing publication or foodstuffs to be consumed within a short time, in which the item or the packaging thereof is fitted, by adhesive means or other means of attachment, with a timer providing a display with a time range adapted to the period of use or interest of the item, or an adapted energy source, and in which the timer, close to the time of production of the item, especially at the time of combining the timer with the item or its packaging, is set and/or configured wherein the improvement comprises that the timer is set and/or configured so that its display is synchronized with the actual time, and that, at the same time, there is an indication of the time of production.

2. A process according to claim 1, wherein the configuration of said timer for synchronizing it with the actual time is effected by a suitable relative positioning of an analogue time indicator having a timescale.

3. A process according to claim 1, wherein said timer, at the time of its attachment to the consumer item or its packaging, is individually configured.

4. A process according to claim 1, characterized in that an electronically operating timer is set in operation by disconnecting an electrically conductive bridge or by an electrically conductive bridging of a separation point which establishes, in particular, the connection with an electric energy source.

5. A process according to claim 1, wherein a chemically operated timer is set in operation by supplying an additional chemical substance.

6. A process according to claim 2, wherein said timescale is produced by printing the consumer item or its packaging.

7. A process according to claim 4, wherein said electrically conductive bridging is effected by a conductive print.

8. A process according to claim 1, wherein said timer is applied, at least partially, by printing or by transfer, more particularly from a film carrier.

9. A process according to claim 1, wherein a plurality of said timers are configured directly before combining the individual timers to form inter-related groups.

10. A process according to claim 1, wherein said timer is applied by a simultaneous or sequential application of a plurality of layers.

11. A consumer item which has a fixedly mounted timer providing a display, having an energy source and a time display range adapted to the time of use or interest of the item and which has means for setting and/or configuring the timer to synchronize it with the actual time, and for indicating the time of production.

12. A consumer item according to claim 11, wherein said timer is provided with a clock module which has a readable display.

13. A consumer item according to claim 11, wherein said timer is in the form of a chemical system.

14. A consumer item according to claim 13, wherein said display is effected by means of a color change produced by chemical reaction on a display track having a timescale which provides, in particular, a chromatographically moving mark for indicating the time.

15. A consumer item according to claim 11, wherein said timer is in the form of a high-pressure system having a first container filled with a colored liquid, and a second equalizing container which is connected with said first container via a meander-shaped capillary.

16. A consumer item according to claim 14, wherein said timer is constructed so as to be actuable by dispensing with its seclusion with respect to the atmosphere.

17. A consumer item according to claim 11, wherein said timer also comprises a rectilinear timescale.

18. A consumer item according to claim 11, wherein said timer also comprises a timescale in the form of a dial.

19. A consumer item according to claim 13, wherein said display consists of flat parts or segments which change their reflection or absorptive capacity or coloring as a function of an applied electric voltage.

20. A consumer item according to any one of claims 11, said timer is arranged at the top of a daily periodical, more particularly near the date given.

21. A consumer item according to claim 11, wherein said timer is arranged on a film-like carrier which simultaneously serves as an advertising carrier.

22. A consumer item according to claim 11, wherein said timer has at least one additional display element, whose input is connected with the output of a storage element which is set in turn by a threshold circuit when the output signal of a sensor element connected with the input of the threshold circuit goes above or below a predetermined value.

23. A consumer item according to claim 22, wherein said sensor element responds to temperature, humidity, pressure, radiation or chemical properties of the surrounding medium, or the expiry of a specified period since the configuration of the timer.

24. A consumer item according to claim 11, wherein said timer is a system operating on a physical basis.

* * * * *